FIG.10
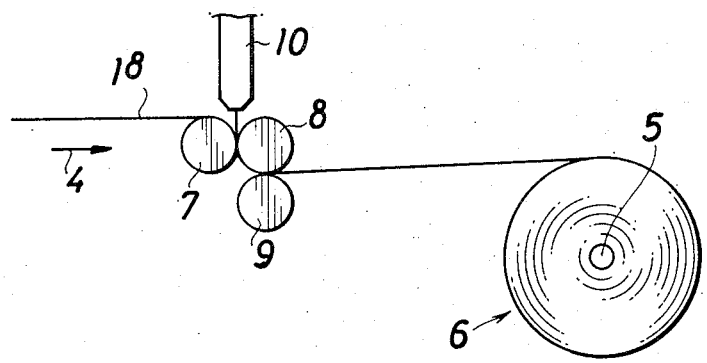
FIG.11
FIG.12
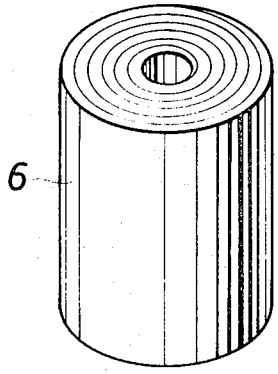
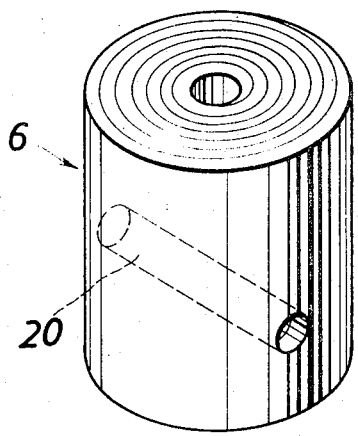

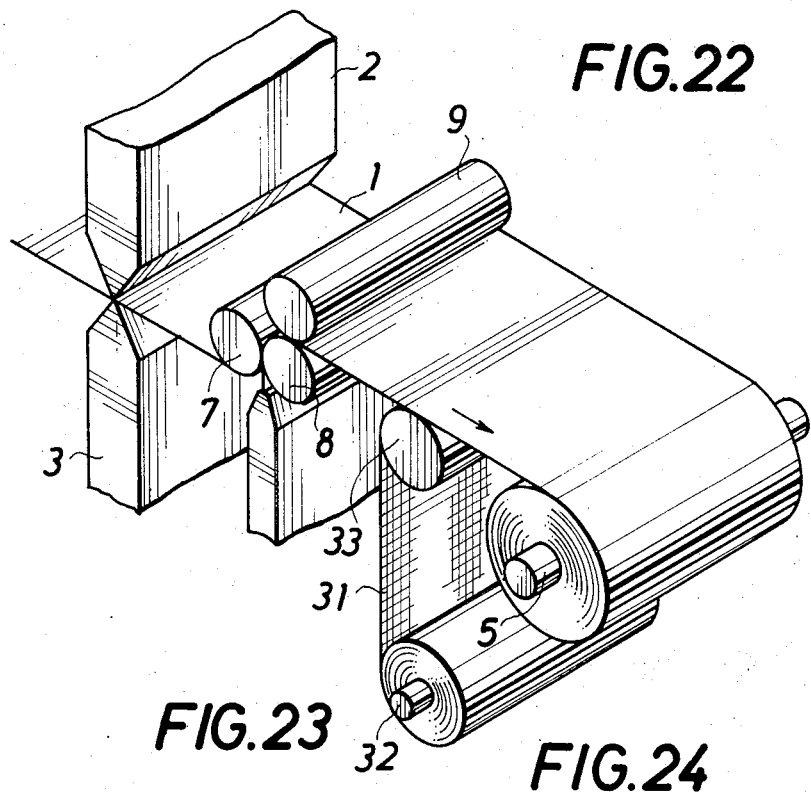
FIG.22
FIG.23
FIG.24
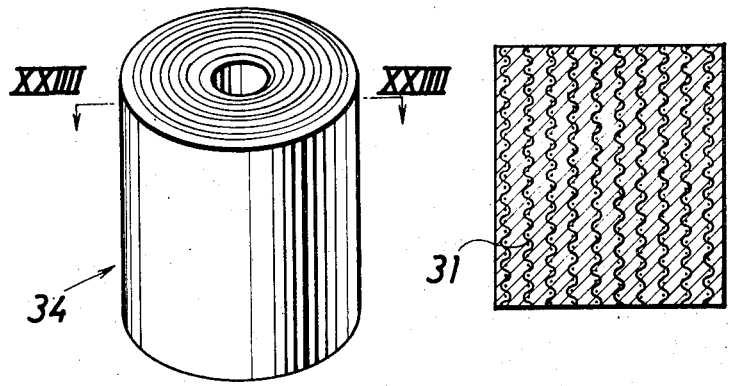

United States Patent Office 3,788,919
Patented Jan. 29, 1974

3,788,919
METHOD OF MANUFACTURING ARTIFICIAL LOGS
Rinnosuke Susuki, Tokyo, Hiroshi Hoshi, Narashino, and Kaoru Umeya, Sendai, Japan, assignors to Lion Fat and Oil Co., Ltd., Tokyo, Japan
Filed Aug. 13, 1971, Ser. No. 171,593
Claims priority, application Japan, Aug. 17, 1970, 45/71,937, 45/71,938; Oct. 1, 1970, 45/86,471; Oct. 6, 1970, 45/87,774, 45/87,775; Oct. 1, 1970 (utility model), 45/97,981
Int. Cl. B31c 13/00
U.S. Cl. 156—184                                     16 Claims

ABSTRACT OF THE DISCLOSURE

A synthetic resin sheet, either foamed or non-foamed, of a synthetic resin material containing a filler is laminated by winding it into the form of a roll to thereby form an artificial log. The artificial log thus produced has a grain structure closely simulating that of natural lumber.

---

This invention relates to artificial logs and, more particularly, to a method of manufacturing artificial logs, piles and pipes by winding a synthetic resin sheet into the form of a roll.

Natural lumber has a peculiar character. This character is largely attributable to its grain structure. However, natural lumber is quite expensive, because no more than only one pillar in case of a large one, for instance, may be usually obtained from a natural log. Particularly in countries of poor natural resources and where wood is mostly imported, the cost of natural lumber is pronounced. Today, various artificial wood materials to substitute for natural lumber have been developed and are marketed. However, presently available artificial wood materials are quite different in character from natural lumber. They are synthesized from materials quite different from natural wood. Natural lumber, on the other hand, has long been the material essential to the life of mankind. Therefore, if an artificial lumber that has a character closely similar to that of natural lumber can be produced, it must be very useful to the mankind. Meanwhile, natural lumber has a deficiency in that its grain structure runs only in one direction.

The present invention is intended in the above aspects, and after continued research it has been made possible to produce artificial wood materials of a character closely simulating that of natural lumber.

A first object of the invention, accordingly, is to provide a method of manufacturing artificial logs in the form of a roll of a sheet and having a character closely simulating that of natural logs.

A second object of the invention is to provide a method of manufacturing artificial logs in the form of a roll of a sheet, which can meet various requirements of the building material such as tensile strength, compression resistance and bending resistance.

A third object of the invention is to provide a method of manufacturing artificial logs in the form of a roll of a sheet, whereby artificial building materials having a character closely simulating the character or grain structure of natural lumber can be produced at a low cost and on a mass production basis.

A fourth object of the invention is to provide a method of manufacturing artificial logs in the form of a roll of a sheet, which enables readily realizing a dual grain structure consisting of two grain structures each closely simulating that of natural lumber.

A fifth object of the invention is to provide a method of manufacturing artificial logs in the form of a roll of a sheet, which enables obtaining a character closely simulating the character of natural lumber and artificial building materials having a pattern not available with natural lumber.

A sixth object of the invention is to provide a method of manufacturing artificial logs in the form of a roll of a sheet, which enables imparting the mildness of natural lumber to artificial ones and improving various mechanical characteristics required for building materials.

A seventh object of the invention is to provide a method of manufacturing artificial logs in the form of a roll of a sheet, which enables realizing a sense of touch closely simulating that of a board obtained from natural lumber and incapable of simulation by the presently marketed laminated boards.

An eighth object of the invention is to provide a method of manufacturing artificial logs in the form of a roll of a sheet of a thermoplastic resin material containing a filler, which can preserve or enhance the strength and moldability of the thermoplastic resin, impart its properties such as difficultly combustible nature, heat resisting nature, rigidity and stability to the sheet, and have the effect of increasing the volume of the material to reduce the cost.

A ninth object of the invention is to provide a method of manufacturing artificial logs in the form of a roll of a sheet, in which the sheet is wound together with a net to increase the tenacity of the building material obtained from the logs by the cooperative effects of the sheet and net as well as providing a character closely simulating that of natural lumber.

A tenth object of the invention is to provide a method of manufacturing artificial logs in the form of a roll of a sheet of a synthetic resin material containing an incombustible filler, which can provide a function of a kind of metal net so that if a building material obtained from the artificial log burns, the possibility of incomplete combustion as a result of coagulation of combustion products on the surface of the material to prevent air flow and generate poisonous gas such as carbon monoxide as is usually the case with the building material composed of a synthetic resin such as plastics alone is eliminated to improve the safety.

The above and other objects, features and advantages of the invention will become more apparent from the following description when read in connection with the accompanying drawing, in which:

FIG. 10 is a schematic representation of a setup suited to carry out a second embodiment of the method of manufacturing artificial logs according to the invention;

FIG. 11 is a perspective view of a pile or pipe obtained by the setup of FIG. 10;

FIG. 12 shows the manner of obtaining a core from the artificial log of FIG. 2;

FIG. 22 is a schematic representation of a set up suited to carry out a fifth embodiment of the method of manufacturing artificial logs according to the invention;

FIG. 23 is a perspective view of an artificial log obtained by the setup of FIG. 22; and FIG. 24 is a sectional view taken along line XXIIII—XXIIII in FIG. 23.

Figure 1:
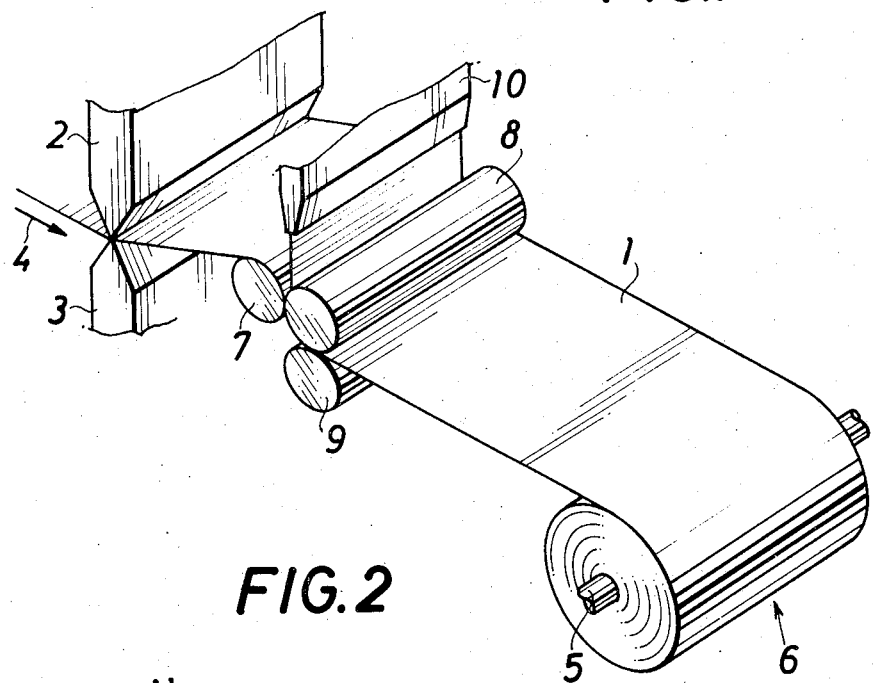
FIG. 1 is a schematic representation of a setup suited to carry out a first embodiment of the method of manufacturing artificial logs according to the invention.

Referring now to FIGS. 1 to 9 and more particularly to FIG. 1, reference numeral 1 designates a non-foamed polyethylene sheet. The sheet 1 is desirably of a thermoplastic resin such as polyethylene, and polyvinyl chloride or a copolymer thereof or a resin composition of said thermoplastic resin and 1 to 95 percent by weight of calcium sulfite and/or plaster as filler materials. The fillers noted above are by no means limitative but such inorganic powdery material as calcium carbonate, manganese dioxide, clay, carbon, graphite, foamed carbon, or organic powdery material, etc., may also be used. Regarding the proportions of the components, according to the invention even if a great quantity of fillers is added the strength and moldability of the thermoplastic resin will not be lowered. The grain size of the fillers added to the resin composition is not limited but is desirably less than 500 microns. As the plaster, either dehydrated gypsum, half-dehydrated gypsum or natural gypsum may be used.

As for the thermoplastic resin copolymer, if a suitable quantity of ethylene vinylacetate is added the elasticity and shock resistance of the material can be enhanced, and hence the mechanical strength thereof can be improved. The sheet 1 is fed in the direction of arrow 4 while being stretched through stretching means 2 and 3, and is taken up on a take-up bobbin 5 to obtain an artificial log 6. At an intermediate position between the stretching means 2 and 3 and the take-up bobbin 5 there are provided calender rollers 7, 8 and 9, through which an adhesive (desirably a hot-melt type adhesive) is continuously or intermittently applied or sprayed from a supply nozzle 10 to the sheet. In addition to the said adhesive, foamed powder obtained by foaming the same material as that of the sheet 1, a mixture obtained by adding a pigment (including phosphorescent pigment) to a polyethylene resin or the like, or inorganic fillers may be applied or sprayed to the sheet together with the adhesive.

Thus, the stretched sheet 1 having passed through the calender rollers 7, 8 and 9 is provided on the upper side thereof with a coating of an adhesive or a coating layer having a printed pattern, and as the sheet is taken up the contact surfaces of the sheet being wound are bonded together. If necessary, a drying means may be provided between the calender roll group and the take-up bobbin, and it may be adjusted so that as the stretched sheet 1 reaches the take-up bobbin 5 the adhesive concentration (in case of chemical bond) or adhesive temperature (in case of thermoset bond) of the coating may be nearly optimum. Also, if necessary the take-up bobbin 5 may be surrounded by heating means for heating the roll of the sheet from outside of the bobbin 5.

Figure 2:
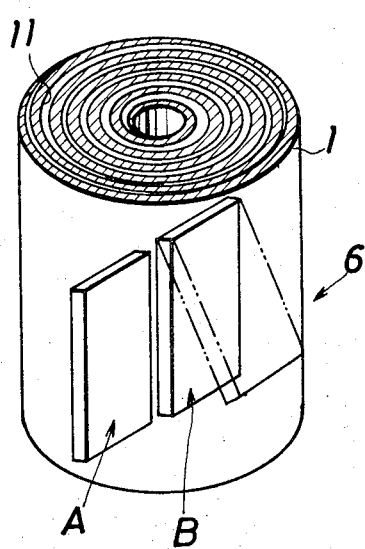
FIG. 2 is a perspective view of an artificial log obtained by the setup of FIG. 1.

FIG. 2 shows an artificial log or row material obtained by taking up the sheet into the form of a roll and hardening it in the above manner. As is apparent from the figure, it has a structure of an alternate arrangement of the layer of sheet 1 and the layer 11 of the adhesive both wound on the take-up bobbin as a core. The sheet portion (of polyethylene in this embodiment) may constitute a relatively soft part, and the adhesive portion may constitute a relatively hard part. The hard adhesive layer portion can simulate the summerwood of the natural lumber, while the soft polyethylene layer portion can simulate the springwood of the natural lumber.

Then, the above row material may have what is thought as a grain structure consisting of the alternate arrangement of soft and hard layers respectively simulating springwood and summerwood. In other words, it is possible to obtain artificial logs having a grain structure simulating that of natural logs.

Figure 3:
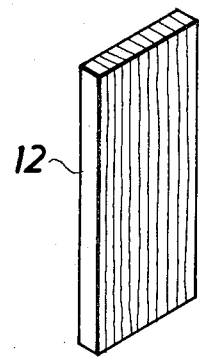
FIGS. 3 to 9 illustrate sawing of various artificial building materials out of the artificial log of FIG. 2.
Figure 4:
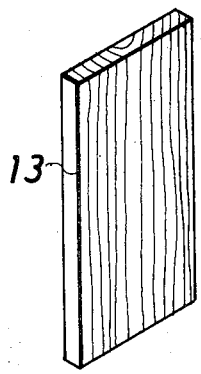
Figure 5:
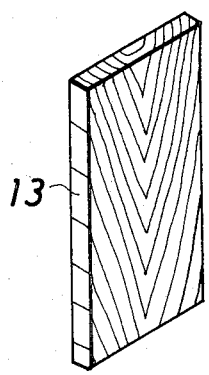

Various boards may be sawed out of the log obtained in the above manner. FIG. 3 shows a board obtained by cutting the log of FIG. 2 in the manner as indicated at A. FIG. 4 shows a board obtained by cutting the log of FIG. 2 in a manner as indicated at B. FIG. 5 shows a board obtained by cutting the log of FIG. 2 in the manner as indicated at B.

Figure 6:
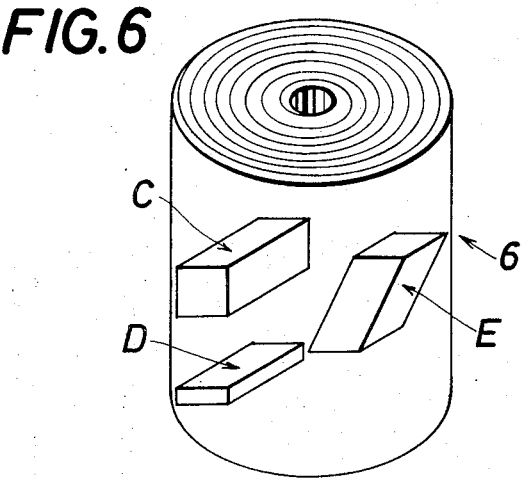
Figure 7:
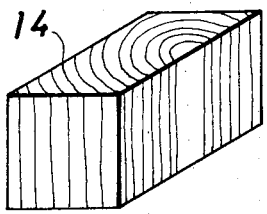
Figures 8, 9:
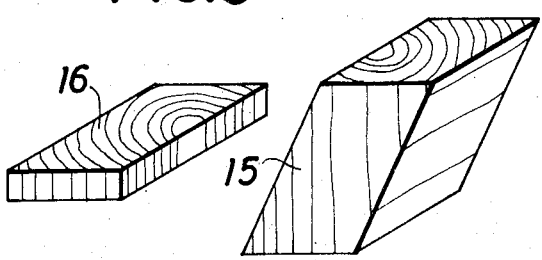

FIG. 6 shows further examples of sawing the artificial log 6. By cutting the log of FIG. 6 in the manner as indicated at C a piller 14 as shown in FIG. 7 may be obtained. By cutting the log of FIG. 6 in the manner as indicated at D a piller 15 as shown in FIG. 8 may be obtained. By cutting the log of FIG. 6 in the manner as indicated at E a board 16 as shown in FIG. 9 may be obtained.

FIG. 10 shows a second embodiment of the invention. The setup for this embodiment is similar to that of the preceding first embodiment except for the absence of the stretching means 2 and 3 as shown in the preceding embodiment. Referring to the figure, reference numeral 18 designates a sheet of the same material as that of the sheet 1 in the preceding first embodiment. In this embodiment, however, the sheet 18 is previously foamed and stretched. Because the sheet is foamed, it is comparatively lighter. As the foaming agent may be used benzene sulfonyl hydrazide, toluene sulfonyl hydrazide, azodicarbonamide and the like.

In this embodiment, the sheet 18 is fed in the direction of arrow 4 in FIG. 10, and an adhesive (preferably of a hot-melt type) is applied or sprayed to the sheet at the calender rollers 7, 8 and 9. Thus, the sheet 18 having passed through the adhesive application station has a coating provided on its upper side, so that as the sheet is taken up on the take-up bobbin 5 the contact surfaces of the sheet being wound are bonded together.

The thermal drying treatment may be done in the same manner as in the preceding first embodiment.

FIG. 11 shows an artificial log 6 thus obtained and which has the same structure as that of FIG. 2 obtained in the preceding first embodiment. By removing the take-up bobbin or core 5 from the log 6, a hollow log may be obtained, which may be used as a pipe. For use as a pile, the hollow log thus obtained may be sharpened at one end.

Figure 13:
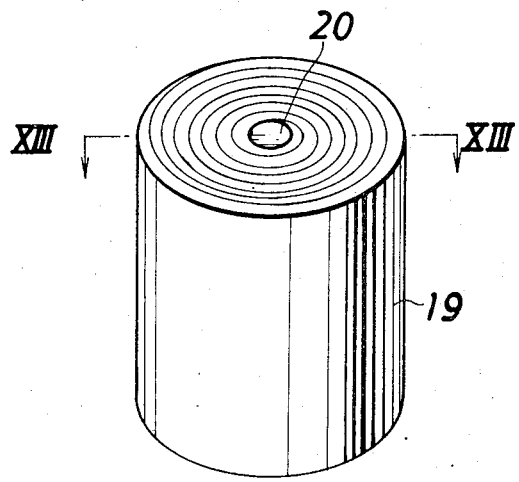
FIG. 13 is a perspective view of an artificial log obtained with the setup of FIG. 1 and by winding a sheet on the core shown in FIG. 12.
Figure 14:
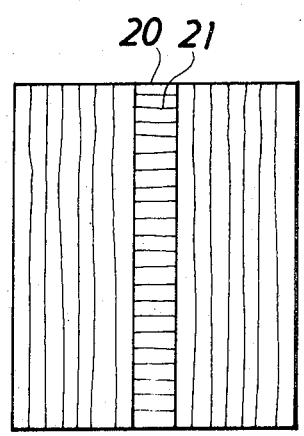
FIG. 14 is a sectional view taken along line XIV—XIV in FIG. 13.

FIGS. 12 to 14 illustrate the manufacture of a different log by using the artificial log 6 according to the first embodiment. A solid cylindrical core 20 is formed from part of the artificial log 6 obtained by the arrangement of FIG. 1 (FIG. 12). This core 20 is used as take-up bobbin to take up a sheet of the same material by using the set-up of FIG. 1, thus producing an artificial log 18 having the core 20 (FIG. 13). In the core 20, annual rings 21 extend in the direction normal to the core axis (FIG. 14). The artificial log thus obtained may be cut to obtain boards or pillars.

As is apparent from FIG. 14, it is possible to obtain a log having a novel grain structure or double grain structure with a longitudinal grain structure running in the body of the log and a lateral or transversal grain structure running in the direction normal to the axis of the core 20. This double grain structure not available with natural lumber may be obtained by merely taking up a sheet on a core having a lateral grain structure. The weak point in the bending of the core is reinforced by the outer body of the log, while the weak point of cracking of the outer body is reinforced by the core. Thus the mechanical strength of the log and lumber obtained therefrom may be extremely enhanced.

Figure 15:
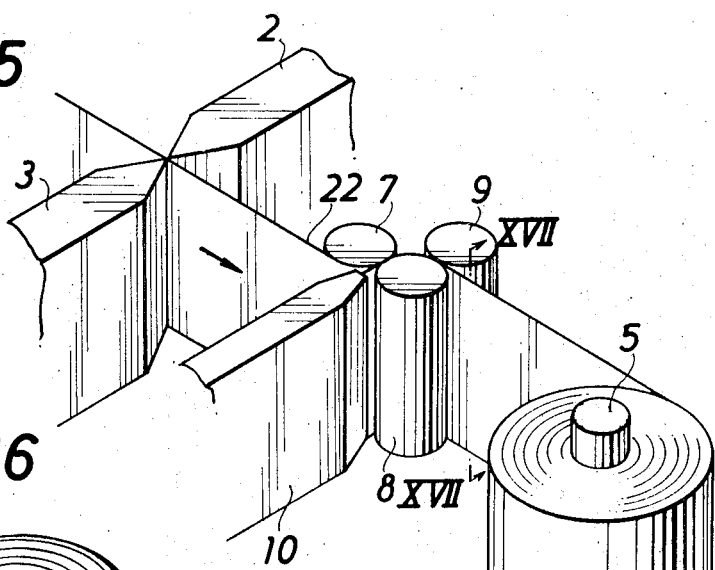
FIG. 15 is a schematic representation of a setup suited to carry out a third embodiment of the method of manufacturing artificial logs according to the invention.
Figure 16:
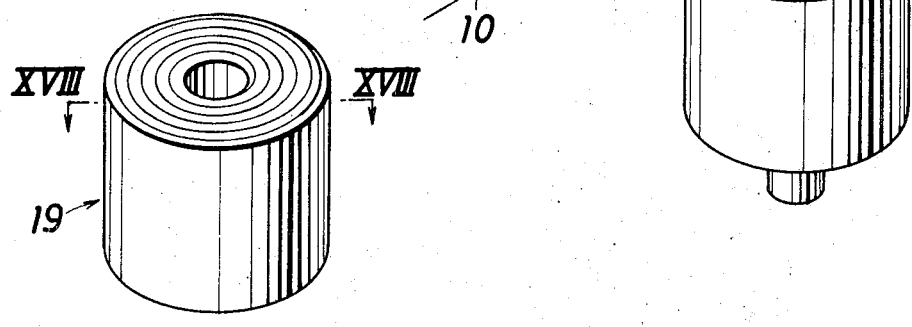
FIG. 16 is a perspective view of an artificial log obtained by the setup of FIG. 15.
Figure 18:
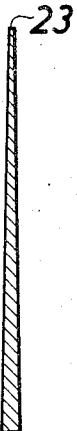
FIG. 18 is a sectional view, to an enlarged scale, taken along line XVIII—XVIII in FIG. 16.

FIG. 15 shows a third embodiment of the invention. Referring to the figure, reference numeral 22 designates a sheet of the same material as that of the sheet 1 in the first embodiment. In this embodiment, however, the thickness of the sheet is not uniform. More particularly, the sheet is progressively thicker in the lateral direction from one edge 23 toward the other edge 24, as shown in FIG. 18. Along the length of the sheet, however, thicker and thinner edge portions alternately occur. This sheet 22 is taken up on take-up bobbin 5 in the same manner as in the first embodiment, and then the take-up bobbin 5 is removed, thus obtaining a hollow artificial log 19, as shown in FIG. 16.

Figure 17:
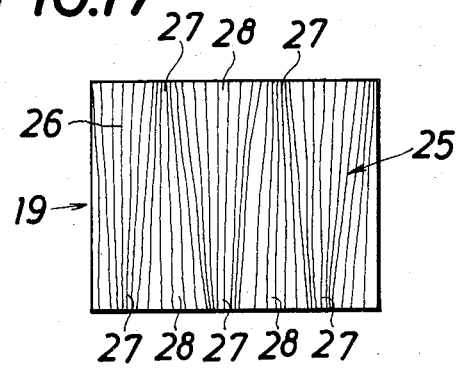
FIG. 17 is a sectional view taken along line XVII—XVII in FIG. 15.

Since the sheet 22 has alternate thicker and thinner portions along the opposite edges thereof, the wavy portions aid in tightly winding the sheet. Besides, an axial section of the artificial log thus obtained presents a pattern 25 not obtainable with natural lumber, as shown in FIG. 17. This pattern obtains as thinner layer 27 gather to form a fine grain and then thicker layers 28 gather to form a coarse grain, and the mountain-like fine and coarse grains occur alternately.

Figure 19:
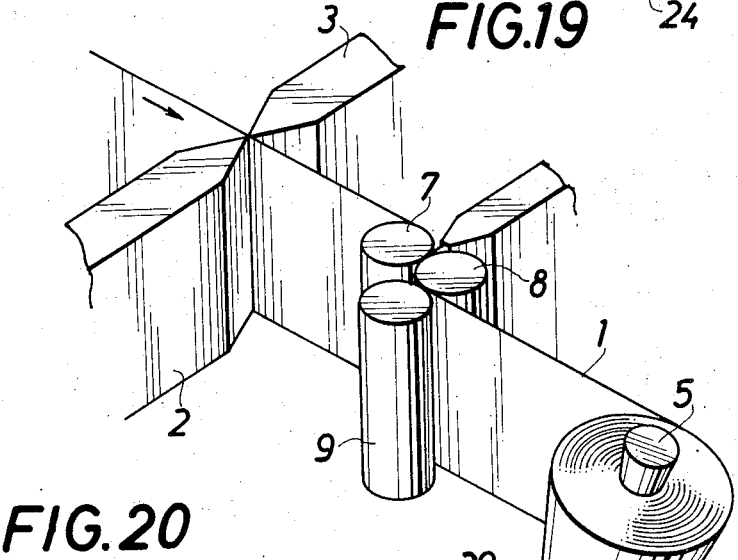
FIG. 19 is a schematic representation of a setup suited to carry out a fourth embodiment of the method of manufacturing artificial logs according to the invention.
Figure 20:
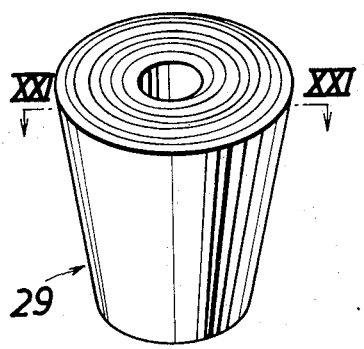
FIG. 20 is a perspective view of an artificial log obtained by the setup of FIG. 19.
Figure 21:
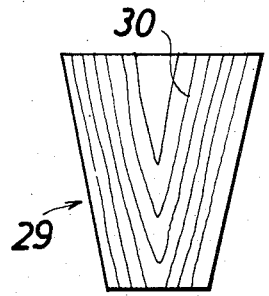
FIG. 21 is a sectional view taken along line XXI—XXI in FIG. 20.

FIG. 19 shows a fourth embodiment of the invention. The setup for this embodiment is similar to that of FIG. 15 except that the take-up bobbin 5 has a frustoconical configuration. The sheet 1 of the same material as that of the sheet in the first embodiment is fed while being stretched by stretching means 2 and 3, and is taken up by take-up bobbin 5 to obtain an artificial log 29. Since the take-up bobbin 5 has such a special configuration as noted above and it is disposed in a slightly eccentric fashion, the lower edge of the sheet 1 in FIG. 19 is slightly thicker than the upper edge thereof. Thus, the artificial log taken up on the take-up bobbin 5 has a frustoconical configuration. By removing the take-up bobbin 5 from the artificial log a hollow artificial log 29 as shown in FIG. 29 is obtained. The axial section of the artificial log 29 presents a grain pattern as shown in FIG. 21.

FIG. 22 shows a fifth embodiment of the invention. In this embodiment, the setup is the same as that in the first embodiment except for the provision of a net supply means. Between the calender rollers 7, 8 and 9 and the take-up bobbin 5 a net supply roller 32 is provided to supply a net 31. Also, there is provided a bite roller 33 in contact with the underside of the sheet 1 of the same material as that of the sheet in the first embodiment. Through the bite roller 33, the net 31 is caused to creep under the sheet 1. The net 31 may be a wire gauze, or it may be of cotton, wood fiber, linen and the like material. As the sheet 1 provided with an adhesive coating layer is taken up together with the net 31 on the take-up bobbin 5, the net 31 is attached to the underside of the sheet 1 at the bite roller 33 and remains attached to the underside of the sheet until the sheet is taken up into the form of a roll. In this case, when the adhesive provided on the underside of the sheet 1 comes into contact with the net 31, the net 31 is pushed against the sheet 1 by the bite roller 33, so that the adhesive merges into the meshes of the net 31 to effect tight bonding of the net to the sheet. Also, effective pressing of the net 31 against the sheet 1 may be readily realized by providing the bite roller 33 at a level higher than the level of the take-up bobbin 5.

By taking the sheet 1 and net 31 with the adhesive merged in the meshes of the net on the take-up bobbin 5, the sheet 1 and net 31 are alternately laminated. At this time, the adhesive brought through the meshes of the net adheres to the upper surface of the sheet 5 being wound. This ensures tight lamination of the sheet 1 and net 31 being taken up on the take-up bobbin 5 into the form of a roll. By removing the take-up bobbin 5 from the roll thus formed, a hollow artificial log 34 with the net 31 intervening between adjacent sheet layers may be obtained. As is apparent from the sectional view of FIG. 24, the sheet and net constituting the artificial log 34 are tightly bonded. Thus, by the cooperative effect of sheet and net the strength of the log itself can be further enhanced. The sheet gives the appearance of natural lumber, so that an artificial building material closely simulating natural lumber in appearance may be obtained.

The following examples are given to show preferred compositions of the sheet in the first embodiment.

EXAMPLE 1

| | Weight percent |
|---|---|
| Medium and low tension polyethylene | 35 |
| Calcium sulfite | 45 |
| Half-dehydrated gypsum | 20 |

The above composition is kneaded by a mixer, and the resultant resin is rolled to obtain a sheet of a desired thickness.

EXAMPLE 2

| | Weight percent |
|---|---|
| Medium and low polyethylene | 20 |
| Calcium sulfite | 40 |
| Dehydrated gypsum | 40 |

From the above composition, a sheet of a desired thickness is formed in the same manner as in Example 1.

The following compositions are preferred to form the sheet 18 in the second embodiment.

EXAMPLE 3

| | Weight percent |
|---|---|
| Medium and low tension polyethylene | 35 |
| Calcium sulfite | 40 |
| Gypsum | 24.5 |
| Azodicarbonamide (foaming agent) | 0.5 |

From the above composition, a sheet of a desired thickness is formed in the same manner as in Example 1.

EXAMPLE 4

| | Weight percent |
|---|---|
| Medium and low tension polyethylene | 35 |
| Calcium sulfite | 45 |
| Half-dehydrated gypsum | 20 |

The above composition is kneaded by a mixer, and the resultant resin is rolled to obtain a sheet having thicker and thinner alternate portions along the opposite edges thereof with thicker portions at one edge being progressively thinner toward the opposite edge and the thinner portions at one edge being progressively thicker toward the opposite edge.

EXAMPLE 5

| | Weight percent |
|---|---|
| Medium and low tension polyethylene | 35 |
| Calcium sulfite | 40 |
| Gypsum | 24.5 |
| Azodicarbonamide (foaming agent) | 0.5 |

From the above composition, a sheet of the same type as in Example 4 is formed.

As has been described in the foregoing, according to the invention it is possible to manufacture artificial logs, from which boards simulating the character of natural lumber and superior in nature to natural lumber may be obtained. Besides, the appearance of boards obtained according to the invention closely resembles that of boards obtained from natural logs, and which cannot be realized by presently available laminated boards. Further, when appropriately sawed it is possible to obtain a particular grain pattern not available with natural lumber.

The foregoing embodiments have been concerned with thermoplastic resins, the invention is by no means limited to these resins, but thermosetting resins may be used as well. In this case, solvent type adhesives may be used. Also, according to the invention a non-foamed sheet and a foamed sheet may be fed together and taken up together into the form of a roll to obtain an artificial log. Such a log may provide the same effects as those obtained in the foregoing embodiments. Further, in taking up a sheet only an adhesive may be continuously applied.

We claim:

1. A method of manufacturing artificial logs comprising the steps of stretching a material composed of a synthetic resin and a filler into a sheet, then applying an adhesive to at least one side of said sheet, winding said sheet on a take-up bobbin into the form of a roll, and hardening said roll, wherein said filler consists of one or more of calcium sulfite, gypsum, calcium carbonate, manganese dioxide, clay and carbon.

2. The method of manufacturing artificial logs according to claim 1, wherein said filler includes foamed carbon powder.

3. The method of manufacturing artificial logs according to claim 1, wherein said synthetic resin sheet is wound on a core obtained from an artificial log, said core having a grain structure running in the direction normal to the axis of said core and the grain structure of said roll.

4. The method of manufacturing artificial logs according to claim 3, wherein said core of said grain structure is obtained by cutting part of said logs from a roll of the same material as said synthetic resin sheet.

5. The method of manufacturing artificial logs according to claim 3, wherein said core of said grain structure is obtained by cutting part of said logs from a roll of a material different from that of said synthetic resin sheet.

6. The method of claim 1 wherein the synthetic resin is polyethylene.

7. The method of manufacturing artificial logs according to claim 1, which further comprises the step of applying a net to one side of said sheet, said net being wound together with said sheet.

8. The method of claim 7 wherein the net is wire gauze.

9. The method of manufacturing artificial logs according to claim 1, wherein the opposite edges of said synthetic resin sheet have thicker and thinner portions alternately merging to each other, said thicker portions becoming progressively thinner toward the opposite edge, said thinner portions becoming progressively thicker toward the opposite edge, whereby the axial section of said artificial logs has a pattern having alternately inverted mountain-like grain regions, the grain of each said grain region being denser toward the mountain top and coarser toward the mountain foot.

10. The method of manufacturing artificial logs according to claim 1 comprising winding the sheet on an eccentrically disposed roll having a frustoconical configuration to form a wound synthetic resin sheet having its upper edge slightly thicker than its lower edge.

11. The method according to claim 1 wherein the synthetic resin is polyethylene, polypropylene or polyvinyl chloride.

12. The method of manufacturing artificial logs comprising the steps of winding a synthetic resin sheet composed of a synthetic resin and containing a filler into the form of a roll on a core obtained from an artificial log, said core having grain structure running in the direction normal to the axis of said core and the grain structure of said roll, and hardening said roll.

13. The method of manufacturing artificial logs comprising the steps of winding a synthetic resin sheet composed of a synthetic resin and containing a filler into the form of a roll and hardening said roll, the opposite edges of said synthetic resin sheet having thicker and thinner portions alternately merging to each other, said thicker portions becoming progressively thinner toward the opposite edge, said thinner portions becoming progressively thicker toward the opposite edge, whereby the axial section of said artificial logs has a pattern having alternately inverted mountain-like grain regions, the grain of each said grain region being denser toward the mountain top and coarser toward the mountain foot.

14. The method of claim 1 wherein the synthetic resin is a thermoplastic synthetic resin.

15. The method of manufacturing artificial logs according to claim 1, wherein said synthetic resin sheet is a foamed sheet.

16. The method of manufacturing artificial logs according to claim 1, wherein said synthetic resin sheet is non-foamed.

References Cited
UNITED STATES PATENTS

| | | | |
|---|---|---|---|
| 918,153 | 4/1909 | Hollinger | 156—193 X |
| 2,870,793 | 1/1959 | Bailey | 52—309 X |
| 3,147,164 | 9/1964 | Adams | 156—62.2 |
| 3,447,988 | 6/1969 | Salo et al. | 156—229 |
| 1,954,183 | 4/1934 | Schlesinger | 156—194 X |
| 1,236,349 | 8/1917 | Poppe et al. | 156—194 X |
| 2,829,404 | 4/1958 | Wilson | 52—233 |
| 3,011,938 | 12/1961 | Chapman | 156—62.2 X |
| 3,220,900 | 11/1965 | Ewerbring | 156—62.2 |

ALFRED I. LEAVITT, Primary Examiner

D. A. SIMMONS, Assistant Examiner

U.S. Cl. X.R.

52—309; 156—189, 193, 229, 250